United States Patent
Park et al.

(10) Patent No.: US 8,442,098 B2
(45) Date of Patent: May 14, 2013

(54) DISTRIBUTED REPEATER AND DISTRIBUTED REPEATING METHOD THEREOF

(75) Inventors: Sung-Ik Park, Daejon (KR); Jae-Hyun Seo, Daejon (KR); Ho-Min Eum, Daejon (KR); Jae-Young Lee, Seoul (KR); Heung-Mook Kim, Daejon (KR); Yong-Tae Lee, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 917 days.

(21) Appl. No.: 12/517,613

(22) PCT Filed: Nov. 30, 2007

(86) PCT No.: PCT/KR2007/006154
§ 371 (c)(1),
(2), (4) Date: Jun. 4, 2009

(87) PCT Pub. No.: WO2008/069506
PCT Pub. Date: Jun. 12, 2008

(65) Prior Publication Data
US 2010/0321577 A1 Dec. 23, 2010

(30) Foreign Application Priority Data
Dec. 5, 2006 (KR) .................. 10-2006-0122516

(51) Int. Cl.
*H04B 3/36* (2006.01)

(52) U.S. Cl.
USPC ................ 375/211; 348/575; 375/343

(58) Field of Classification Search ............ 348/575, 348/725; 375/211; 455/23, 24, 278.1, 456.1; 725/131
See application file for complete search history.

(56) References Cited

U.S. PATENT DOCUMENTS

| | | | |
|---|---|---|---|
| 4,539,706 A | 9/1985 | Mears et al. | |
| 6,385,435 B1 * | 5/2002 | Lee | 455/24 |
| 6,798,791 B1 * | 9/2004 | Riazi et al. | 370/515 |
| 7,756,473 B2 * | 7/2010 | Seo et al. | 455/22 |
| 2003/0008669 A1 * | 1/2003 | Stein et al. | 455/456 |
| 2004/0237117 A1 * | 11/2004 | Park et al. | 725/131 |

FOREIGN PATENT DOCUMENTS

| | | |
|---|---|---|
| CA | 2 564 236 A1 | 11/2005 |
| JP | 2002-330112 A | 11/2002 |

(Continued)

OTHER PUBLICATIONS

International Search Report; mailed Mar. 10, 2008; PCT/KR2007/006154.

*Primary Examiner* — Leon-Viet Nguyen
(74) *Attorney, Agent, or Firm* — Ladas & Parry LLP (57) ABSTRACT

Provided are a distributed repeater for repeating output signals identical to input signals through a channel different from that of main transmitter signals but identical to channels of other distributed repeaters, and a distributed repeating method thereof. The distributed repeater includes: a pre-processing unit configured to receive a radio frequency (RF) signal transmitted from an external device and demodulate the RF signal into a baseband signal; an equalizer configured to equalize the baseband signal to correct a distortion occurring on a transmission channel; an identification signal generation and insertion unit configured to generate an identification signal for identification of the distributed repeater and network conditioning, and insert the identification signal in the equalized baseband signal; and a post-processing unit configured to convert the baseband signal from the identification signal generation and insertion unit into an RF signal, and send the RF signal.

16 Claims, 6 Drawing Sheets

FOREIGN PATENT DOCUMENTS

| | | |
|---|---|---|
| KR | 1020010111268 A | 12/2001 |
| KR | 1020050013783 A | 2/2005 |
| KR | 1020050109043 A | 11/2005 |
| KR | 1020050109043 A * | 11/2005 |
| KR | 10-0540171 B1 | 12/2005 |
| WO | 2005/041571 A1 | 5/2005 |

* cited by examiner

☐ : SHIFT REGISTER
⊕ : EXCLUSIVE OR

DISTRIBUTED REPEATER AND DISTRIBUTED REPEATING METHOD THEREOF

TECHNICAL FIELD

The present invention relates to a distributed repeater for repeating a terrestrial digital television broadcast signal, and a distributed repeating method thereof; and, more particularly, to a distributed repeater for converting radio frequency (RF) signals transmitted from a main transmitter into baseband signals, removing from the baseband signal noise and multipath signals caused in a channel between the main transmitter and the distributed repeater, and converting the baseband signals into RF signals so that output signals identical to input signals are repeated through a channel different from that of main transmitter signals but identical to channels of other distributed repeaters, and a distributed repeating method thereof.

This work was supported by the IT R&D program of MIC/IITA [2006-S-016-01, "Development of Distributed Translator Technology for Terrestrial DTV"].

BACKGROUND ART

A distributed repeater for repeating a terrestrial digital television broadcast signal and a distributed repeating method thereof will be described as exemplary embodiments, but the present invention is not limited thereto.

For a broadcasting service, main transmitters and repeaters are placed according to peripheral topography/natural features on the earth, and a broadcasting zone of a broadcaster. The repeater is installed in an area where a broadcast signal of a low level is received from the main transmitter in order to prevent poor signal reception and broaden the signal transmission coverage of the main transmitter.

Figure 1:
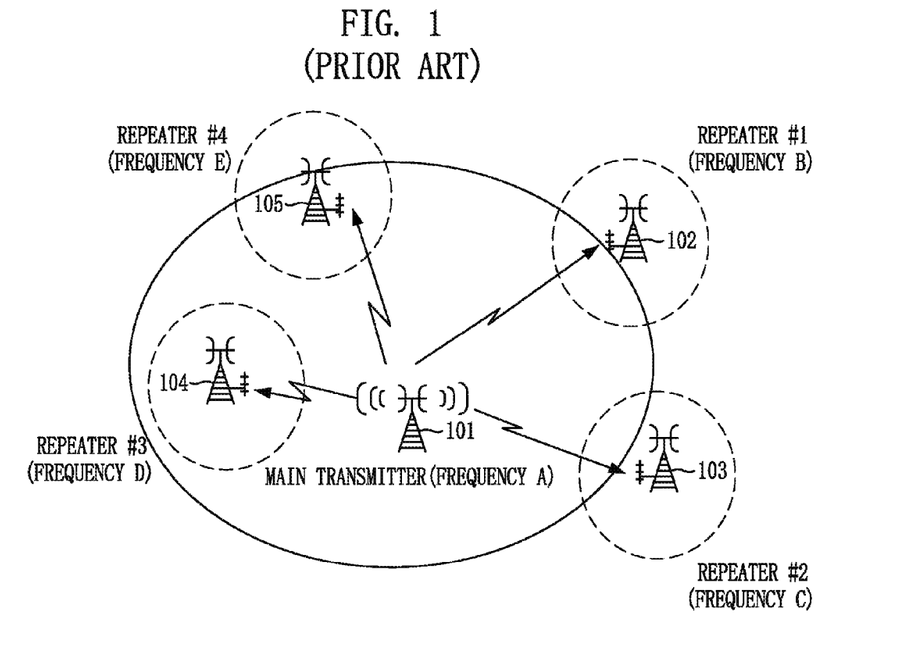
FIG. 1 illustrates one example explaining a broadcasting service employing general repeaters.

FIG. 1 illustrates one example explaining a broadcasting service employing general repeaters using respectively different frequencies.

Referring to FIG. 1, in a broadcasting service employing general repeaters, a main transmitter 101 sends out broadcast signals using a transmission frequency, and other repeaters 102 to 105 repeat the broadcast signals using frequencies B, C, D and E, respectively, which are different from the transmission frequency A. The repeaters 102 to 105 use respectively different frequencies B, C, D and E to overcome poor signal reception or broaden a broadcasting coverage. Since the repeaters 102 to 105 use a plurality of frequency bands, many frequency resources are required, which makes the frequency use significantly inefficient.

If the repeaters use the same frequency as the main transmitter for a broadcasting service, an effect of reusing a frequency can be obtained even in a local area, improving frequency utility efficiency.

Figure 2:
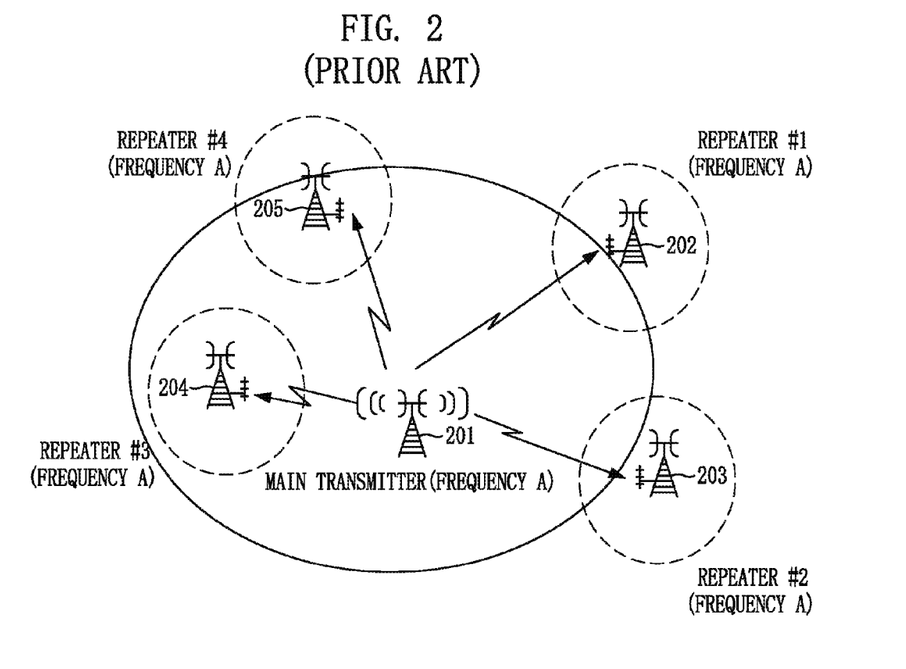
FIG. 2 illustrates another example explaining a broadcasting service employing general repeaters.

FIG. 2 illustrates another example explaining a broadcasting service employing general repeaters, which are on-channel repeaters that use an identical frequency.

A main transmitter 201 sends out broadcast signals using a transmission frequency A, and each of on-channel repeaters 202 to 205 repeats signals, using the same frequency as the transmission frequency A. To this end, a receiver must be able to identify output signals of the main transmitter 201 from those of the on-channel repeaters 202 to 205 although they use the same frequency band. Also, output signals of the on-channel repeaters 202 to 205 must be identical to the output signal of the main transmitter 201, and time delay of the two output signals must be short.

However, the on-channel repeating technology has the following limitations of low utilization of existing emission facilities and large investment. Therefore, there is a need for a cost-effective technology that can maximize the use of the existing emission facilities, allow implementation thereof within a short time, and improve the frequency utility efficiency.

Figure 3:
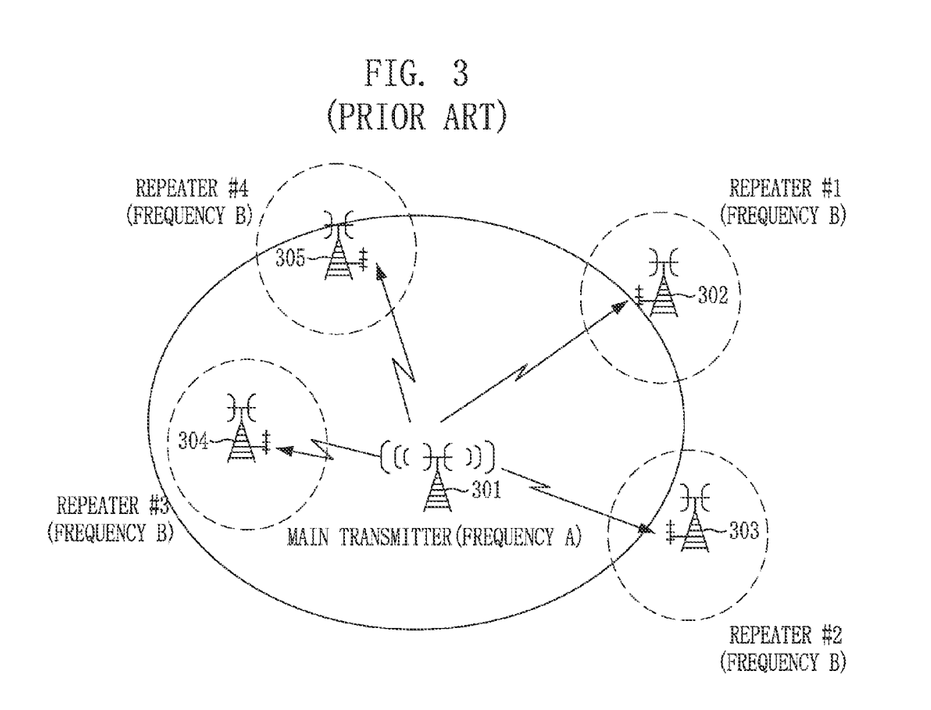
FIG. 3 illustrates another embodiment explaining a broadcasting service employing general repeaters.

FIG. 3 illustrates another example for explaining a broadcasting service using general repeaters, which are distributed repeaters using the same frequency but different from a frequency of a main repeater.

A main transmitter 301 sends broadcast signals using a transmission frequency A, and distributed repeaters 302 to 305 repeat the signals using a frequency B different from the transmission frequency A.

Referring to FIG. 3, as the distributed repeaters are used, output power of the distributed repeater is not affected by feedback signals which are generated by low isolation of Tx/Rx antennas because transmitting frequency is different from receiving frequency. That is, the existing emission can be used to a maximum extent, and implementation thereof can be achieved within a short time, so that a cost-effective broadcasting service network can be implemented. To this end, a receiver must be able to identify signals sent from the distributed repeaters 302 to 305, and output signals of the distributed repeaters 302 to 305 must be the same.

Therefore, it is required to develop a distributed repeater that outputs the same output signals as output signals of other distributed repeaters and removes noise and multipath signals so that characteristics of the output signals of the distributed repeater becomes superior to those of the input signals.

DISCLOSURE OF INVENTION

Technical Problem

An embodiment of the present invention is directed to providing a distributed repeater adapted to convert an RF signal transmitted from a main transmitter to the distributed repeater into a baseband signal, remove from the baseband signal noise and a multipath signal generated by a channel between the main transmitter and the distributed repeater by using a high-performance equalizer, and convert the baseband signal into an RF signal in order to repeat the same output signal as an input signal, using the same channel as other distributed repeater but different from a channel of a signal of the main transmitter, and a distributed repeating method thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a distributed repeater for repeating a signal, which includes: a pre-processing unit adapted to receive a radio frequency (RF) signal transmitted from an external device and demodulate the RF signal into a baseband signal; an equalizer adapted to equalize the baseband signal to correct a distortion occurring on a transmission channel; an identification signal generation and insertion unit adapted to generate an identification signal for identification of the distributed repeater and network conditioning, and insert the identification signal in the equalized baseband signal; and a post-processing unit adapted to convert the baseband signal from the identification signal generation and insertion unit into an RF signal, and send the RF signal.

In accordance with another aspect of the present invention, there is provided a distributed repeating method for repeating a signal, which includes the steps of: receiving a radio frequency (RF) signal transmitted from an external device and demodulating the RF signal into a baseband signal; equalizing the baseband signal to correct a distortion generated on a transmission channel; generating an identification signal for identification of a distributed repeater and network conditioning, and inserting the identification signal in the equalized baseband signal; and modulating the baseband signal including the inserted identification signal into an RF signal, and sending the RF signal.

Advantageous Effects

According to an embodiment of the present invention, RF signals transmitted from a main transmitter to a distributed repeater are converted into baseband signals. Noise and multipath signals generated by a channel between the main transmitter and the distributed repeater are removed from the baseband signal by using a high-performance equalizer. The baseband signal is converted into an RF signal. Accordingly, the same output signals as input signals can be repeated, using a channel which is the same as signal channels of other distributed repeaters but different from the signal channel of the main transmitter. Thus, the distributed repeaters can output the same output signals, and the noise and multipath signal generated by the channel between the main transmitter and the distributed repeater can be removed. Accordingly, characteristics of the output signals of the distributed repeater can become superior to those of input signals thereof.

Also, the distributed repeater in accordance with an embodiment of the present invention is not limited by a feedback signal which is generated by low isolation of Tx/Rx antennas because transmitting frequency is different from receiving frequency, and transmission output of the distributed repeater can be increased.

MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 4:
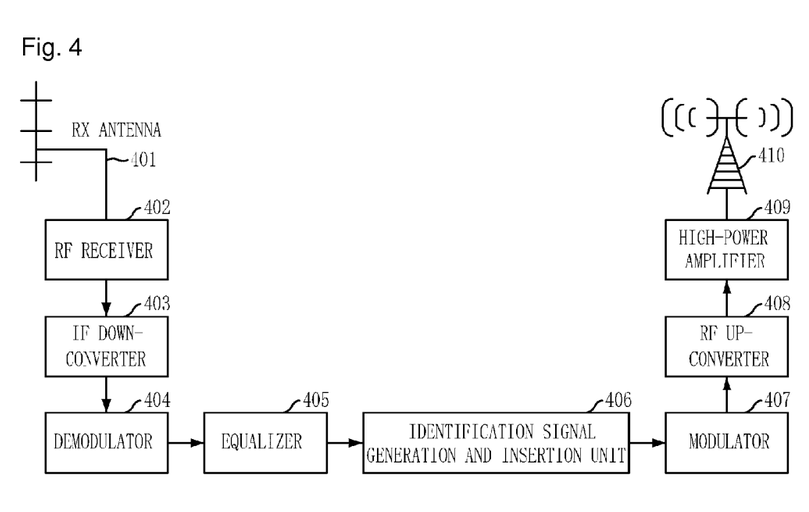
FIG. 4 is a block diagram illustrating a distributed repeater for terrestrial digital television broadcast signals in accordance with an embodiment of the present invention.

FIG. 4 is a block diagram illustrating a distributed repeater for terrestrial digital television broadcast signals in accordance with an embodiment of the present invention.

Referring to FIG. 4, the distributed repeater for terrestrial digital television broadcast signals in accordance with an embodiment of the present invention includes a radio frequency (RF) receiver 402, an intermediate frequency (IF) down-converter 403, a de-modulator 404, an equalizer 405, an identification signal generation and insertion unit 406, a modulator 407, an RF up-converter 408, and a high-power amplifier 409.

The RF receiver 402 receives RF broadcast signals from a main transmitter via an Rx antenna 401. The IF down-converter 403 down-converts the RF broadcast signals received by the RF receiver 402 into IF signals. The demodulator 404 converts the IF signals into baseband signals. The equalizer 405 equalizes the baseband signals to correct a distortion occurring on a transmission channel. The identification signal generation and insertion unit 406 generates an identification signal and insert the identification signal in the baseband signal equalized by the equalizer 405. The identification signal has a good correlation characteristic for identification of the distributed repeater and network conditioning. The modulator 407 converts the baseband signal including the inserted identification signal into an IF signal. The RF up-converter 408 up-converts the IF signal from the modulator 407 into an RF broadcast signal. The high-power amplifier 4009 amplifies the RF broadcast signal and sends the amplified RF broadcast signal via a Tx antenna 410.

The distributed repeater for terrestrial digital television broadcast signals in accordance with an embodiment of the present invention will now be described.

The Rx antenna 401 and the RF receiver 402 receive RF broadcast signals transmitted from a main transmitter. The IF down-converter 403 down-converts the received RF broadcast signals into IF signals, and then, the demodulator 404 converts the IF signals into baseband signals.

When the baseband signals are inputted to the high-performance equalizer 405, the equalizer 405 removes noise and multipath signals from the baseband signals. The noise and the multipath signals are generated in a channel between the main transmitter and the distributed repeater.

Thereafter, when the baseband signals without the noise and the multipath signal are inputted to the identification signal generation and insertion unit 406, the identification signal generation and insertion unit 406 generates an identification signal with a good correlation characteristic for identification of the distributed repeater and network conditioning, and inserts the identification signal into a baseband signal without the noise and the multipath signals.

The good correlation characteristic means that if two arbitrary sequences having a length n are respectively s(n)

and t(n), auto-correlation $R_s(\tau)$ indicating a correlation with s(n)

itself expressed as the following Equation 1 is expressed as the following Equation 2, and cross-correlation $R_{s,t}(\tau)$ indicating a correlation with another sequence t(n)

expressed as the following Equation 3 is expressed as the following Equation 4. That is, it means that an auto-correlation value $R_s(0)=N$ in the case of synchronization

τ=0 is sufficiently greater than a cross-correlation value $R_{s,t}(\tau)$, all τ and an auto-correlation value $R_s(\tau), \tau \neq 0$ in the case of asynchronization so that detection of a sequence is facilitated.

MathFigure 1

$$R_s(\tau) = \sum_{n=0}^{N-1} s(n) \cdot s(n-\tau)$$ [Math. 1]

MathFigure 2

$$|R_s(\tau)| = \begin{cases} N, & \tau=0 \\ small, & 1 \leq \tau \leq N-1 \end{cases}$$ [Math. 2]

MathFigure 3

$$R_{s,t}(\tau) = \sum_{n=0}^{N-1} s(n) \cdot t(n-\tau)$$ [Math. 3]

MathFigure 4

$$|R_{s,t}(\tau)| = small, \text{ all } \tau$$ [Math. 4]

Figure 6:
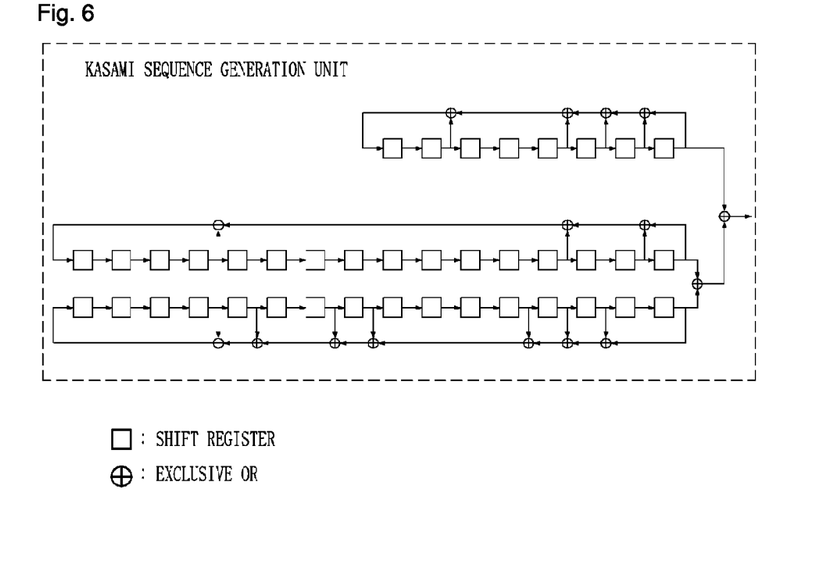
FIG. 6 illustrates one example of a Kasami sequence generator used in the present invention.
Figure 7:
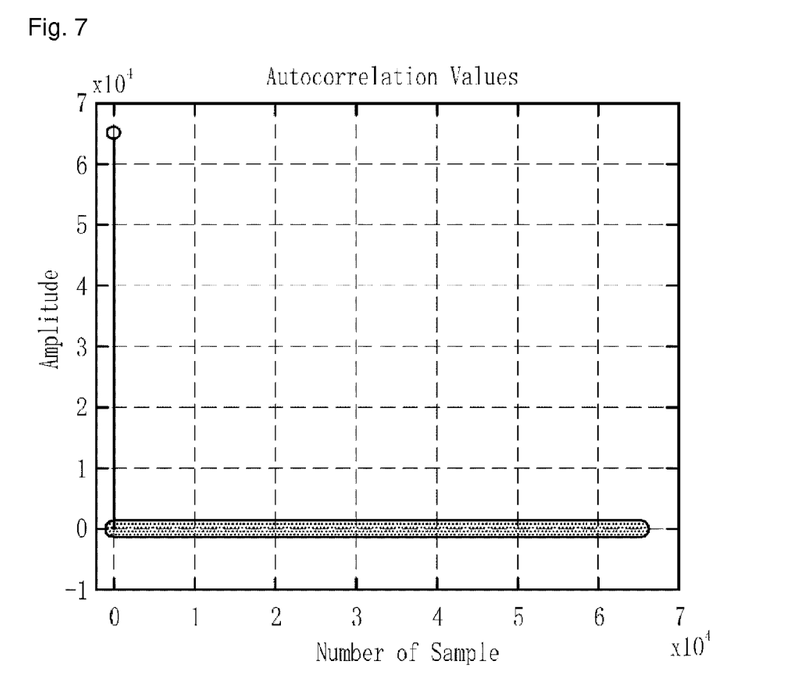
FIG. 7 illustrates autocorrelation values of a Kasami sequence.
Figure 8:
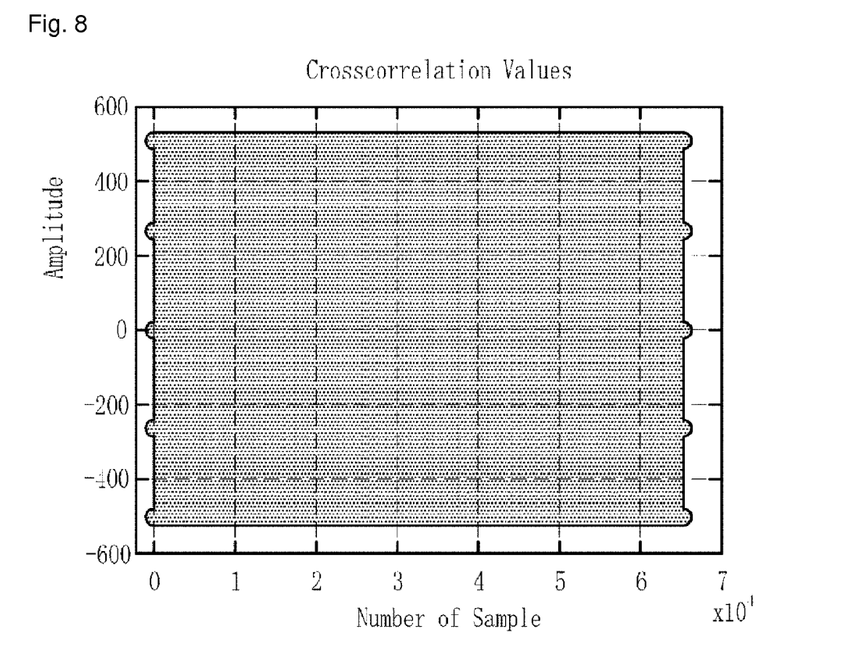
FIG. 8 illustrates cross-correlation values of a Kasami sequence.

Examples of a sequence with a good correlation characteristic include an m-sequence, a Kasami sequence, and a Gold sequence. In the Advanced Television Systems Committee (ATSC) digital TV (DTV) standard, a Kasami sequence having a length i.e., a period, of 65535 is used as an identification signal, and the structure thereof, which is a known technology, is as illustrated in FIG. 6. FIG. 7 illustrates auto-correlation values of a Kasami sequence, FIG. 8 illustrates cross-correlation values of a Kasami sequence.

Figure 9:
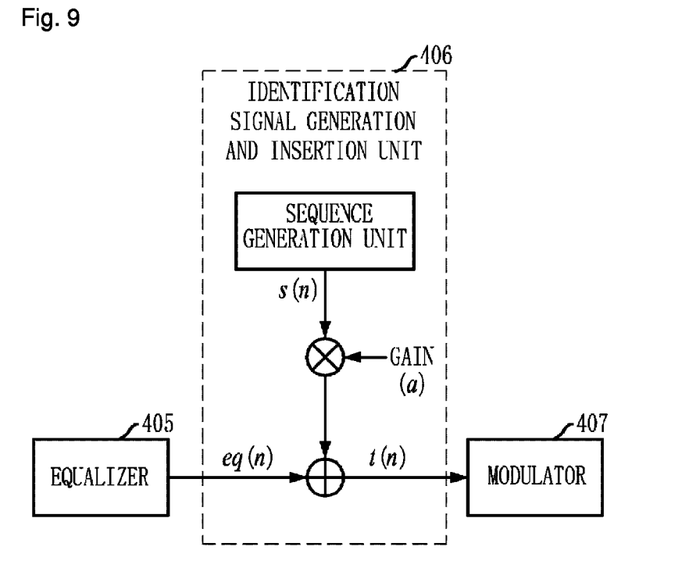
FIG. 9 is a block diagram describing an identification signal generation and insertion unit in accordance with an embodiment of the present invention.

If a sequence with the good correlation characteristic is s(n)

and an equalizer output signal is eq(n), a signal t(n)

including an inserted identification signal, i.e., an input signal of the modulator 407 is expressed as the following Equation 5, and has a structure, for example, as illustrated in FIG. 9. Referring to FIG. 9, a sequence generator generates a sequence s(n)

with a good correlation characteristic. The sequence s(n)

generated by the sequence generator is multiplied by a constant

α that determines an insertion level of the identification signal. Then, a resulting signal is added to an output signal eq(n) of the equalizer 405, and thus a signal t(n)

is inputted to the modulator 407.

MathFigure 5

$$t(n)=eq(n)+\alpha \cdot s(n)$$ [Math. 5]

where

α is a constant that determines an insertion level of an identification signal.

Thereafter, the modulator 407 converts the baseband signals including the identification signal inserted thereto into IF signals, and the RF up-converter 408 up-converts the IF signals into RF broadcast signals. The high-power amplifier 409 amplifies the RF broadcast signals. The amplified RF broadcast signals are sent via the Tx antenna 410 of the distributed repeater.

The distributed repeater for a terrestrial digital television broadcast signal in accordance with an embodiment of the present invention does not use an error correction decoder and encoder, thereby obviating an ambiguity issue that arises due to a difference between an input signal and an output signal of the distributed repeater. Also, since the high-performance equalizer is used to remove noise and multipath signals generated in a channel between the main transmitter and the distributed repeater, characteristics of output signals of the distributed repeater becomes superior to those of input signals thereof.

In the distributed repeater for a terrestrial digital television broadcast signal in accordance with an embodiment of the present invention, a frequency of a signal received from the main transmitter is different from a frequency of an output signal of the distributed repeater. Accordingly, the distributed repeater does not need to remove a feedback signal which is generated by low isolation of Tx/Rx antennas because transmitting frequency is different from receiving frequency. That is, the output power of the distributed repeater is not limited by the feedback signal.

Figure 5:
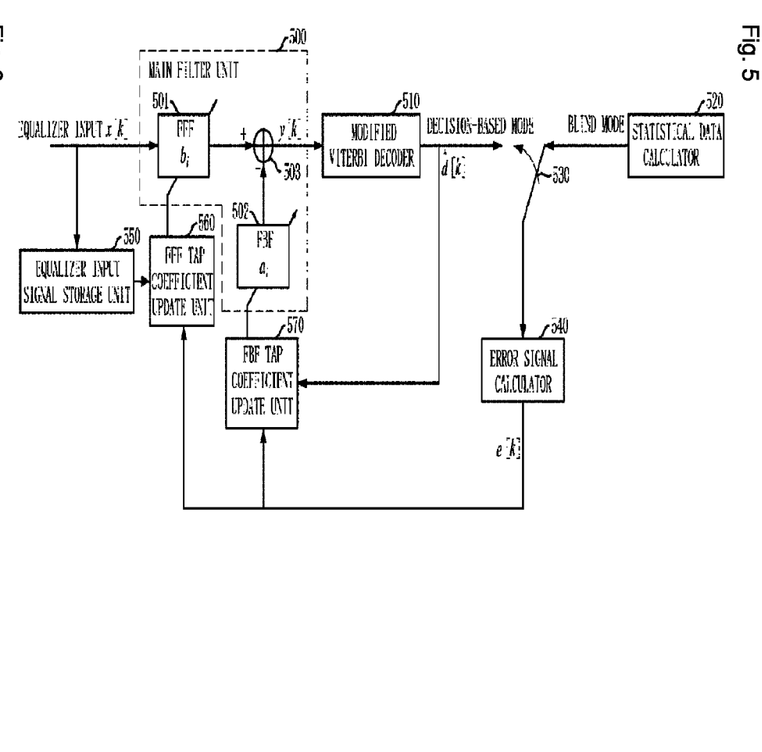
FIG. 5 is a block diagram illustrating an equalizer of a distributed repeater in accordance with an embodiment of the present invention.

FIG. 5 is a block diagram illustrating an equalizer of a distributed repeater in accordance with an embodiment of the present invention.

Referring to FIG. 5, the equalizer 405 of the distributed repeater in accordance with an embodiment of the present invention includes a main filter unit 500, a modified viterbi decoder 510, a statistical data calculator 520, a switching unit 530, an error-signal calculator 540, an equalizer input-signal storage 550, a feedforward filter (FFF) tap coefficient update unit 560, and a feedback filter (FBF) tap coefficient update unit 570. The main filter unit 500 performs channel equalization by filtering a signal being inputted or applied from the demodulator 404. The modified viterbi decoder 510 detects a symbol from a digital broadcast signal inputted from the main filter unit 500 by using a modified viterbi decoding algorithm with a trace back depth (TBD) of 1 and reduced complexity. The statistical data calculator 520 calculates and outputs statistical data required in a blind mode. The switching unit 530 selects an output signal of the modified viterbi decoder in the case of a decision-based mode and to select an output signal of the statistical data calculator 520 in the case of a blind mode. The error-signal calculator 540 compares an output signal selected by the switching unit 530 with an output signal y[k] of the main filter unit 500 to calculate an error signal e[k].

The output signal selected by the switching unit 530 is one of an output signal d[k] of the modified viterbi decoder 510 and an output signal of the statistical data calculator 520. The equalizer input signal storage 550 stores a signal inputted from the demodulator 404. The FFF tap coefficient update unit 560 updates a tap coefficient $b_i[k]$ of a feedforward filter 501 of the main filter unit 500 by using an output signal of the equalizer input signal storage 550 and the error signal e[k] from the error-signal calculator 540. The FBF tap coefficient update unit 570 updates a tap coefficient $a_i[k]$ of a feedback filter 502 of the main filter unit 500 by using the output signal $\tilde{d}[k]$ of the modified viterbi decoder 510 and the error signal e[k] from the error-signal calculator 540.

The main filter unit 500 includes the feedforward filter 501 and the feedback filter 502 to perform channel equalization by repetitively filtering a signal being input or applied from the demodulator 404, and to detect a symbol from a digital broadcast signal inputted from the main filter unit 500 by using a modified viterbi decoding algorithm with a TBD of 1 and reduced complexity.

The statistical data calculator 520 calculates statistical data, e.g., statistical error data, required in the blind mode, and outputs the data to the switching unit 530. The switching unit 530 selects an output signal of the decision-based mode or the blind mode. To be specific, the statistical data calculator 520 selects the output signal of the modified viterbi decoder 510 in the case of the decision-based mode, and selects the output signal of the statistical data calculator 520 in the case of the blind mode.

The error-signal calculator 540 compares the output signal $\tilde{d}[k]$ of the modified viterbi decoder 510 or the output signal of the statistical data calculator 520 with the output signal y[k] of the main filter unit 500 to calculate the error signal e[k].

The tap coefficient update units 560 and 570 calculate a tap coefficient of the main filter unit 500 on the basis of the error signal calculated by the error signal calculator 540. That is, the FFF tap coefficient update unit 560 updates a tap coefficient $b_i$ of the feedback forward filter 501 by using an output signal of the equalizer input signal storage 550 and the error signal e[k] calculated by the error-signal calculator 540. The FBF tap coefficient update unit 570 updates a tap coefficient $a_i$ of the feedback filter 502 by using the output signal $\tilde{d}[k]$ of the modified viterbi decoder 510 and the error signal e[k] calculated by the error signal calculator 540.

Instead of the modified viterbi decoder 510 of the equalizer, which serves as a symbol detector, a symbol detector for detecting a symbol may be implemented by using one of a viterbi decoder, a soft output viterbi algorithm (SOVA) decoder, or a simple slicer in accordance with an embodiment of the present invention.

In the distributed repeater in accordance with an embodiment of the present invention, in a data section including a training sequence, the training sequence is used as an output signal of the equalizer, while in a data section without a training sequence, an output signal of the symbol detector is used as the output signal of the equalizer. In such a manner, noise caused by the channel between the main transmitter and the distributed repeater can be removed.

Figure 10:
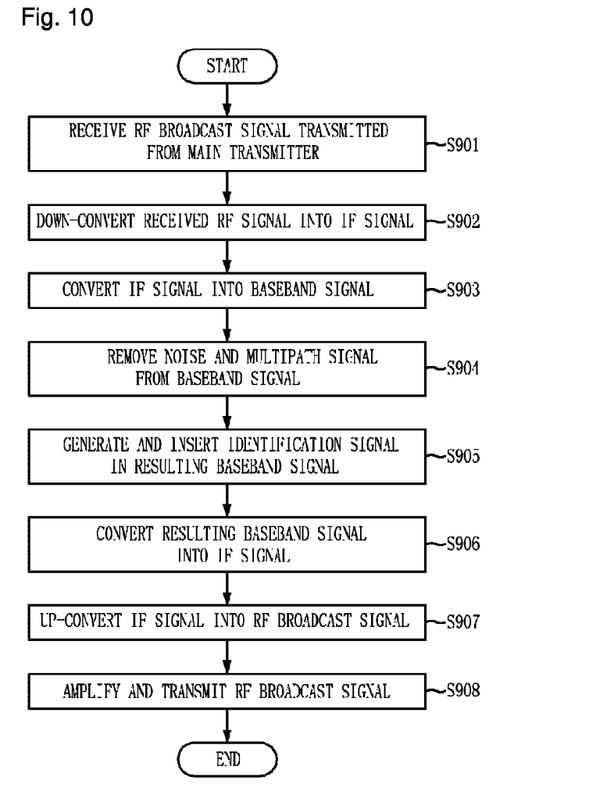
FIG. 10 is a flowchart describing a distributed repeating method for distributedly repeating terrestrial digital television broadcast signals in accordance with an embodiment of the present invention.

As the distributed repeater having the aforementioned configuration is used, output signals of distributed repeaters are the same as an output signal of the main transmitter, and noise and a multipath signal generated by a channel between the main transmitter and the distributed repeater can be removed. The removal of the noise and multipath signal can contribute to making a characteristic of an output signal of the distributed repeater superior to that of an input signal of the distributed repeater. Also, the distributed repeater is not limited by a feedback signal which is generated by low isolation of Tx/Rx antennas because transmitting frequency is different from receiving frequency. Accordingly, the transmission output can be increased FIG. 10 is a flowchart describing a distributed repeating method for distributedly repeating terrestrial digital television broadcast signals in accordance with an embodiment of the present invention.

In step S901, an RF broadcast signal transmitted from a main transmitter is received. In step S902, the received RF broadcast signal is down-converted into an IF signal.

In step S903, the IF signal is converted into a baseband signal. In step S904, noise and a multipath signal generated by a channel between the main transmitter and the distributed repeater are removed from the baseband signal.

In step S905, an identification signal with a good correlation characteristic is generated and is inserted in the baseband signal from which the noise and the multipath signal have been removed, for identification of the distributed repeater and network conditioning. In step S906, the baseband signal including the inserted identification signal is converted into an IF signal.

In step 907, the IF signal is up-converted into an RF broadcast signal, and in step S908, the RF broadcast signal is amplified and sent.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application No. 2006-0122516, filed in the Korean Intellectual Property Office on Dec. 5, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A distributed repeater for repeating a signal, comprising:
a pre-processing unit configured to receive a first radio frequency (RF) signal transmitted from an external device and demodulate the first RF signal into a baseband signal;
an equalizer configured to equalize the baseband signal to correct a distortion occurring on a transmission channel;
an identification signal generation and insertion unit configured to generate an identification signal for identification of the distributed repeater and network conditioning, and insert the identification signal in the equalized baseband signal; and
a post-processing unit configured to convert the baseband signal from the identification signal generation and insertion unit into an a second RF signal different from the first RF signal, and send the second RF signal,
wherein the equalizer comprises:
an equalizer input-signal storage configured to store a signal input from the pre-processing unit;
a filtering unit configured to filter the signal inputted from the pre-processing unit to perform channel equalization;
a symbol detector configured to detect a symbol from a signal input from the filtering unit;
a statistical data calculator configured to calculate statistical data required in a blind mode;
a selection unit configured to select an output signal of a decision-based mode or the blind mode;
an error-signal calculator configured to compare an output signal of the filtering unit with the output signal selected by the selection unit to calculate an error signal; and
a tap coefficient update unit configured to update a tap coefficient of the filtering unit on the basis of the error signal calculated by the error signal calculator.

2. The distributed repeater of claim 1, wherein the filtering unit comprises a feedforward filter (FFF) and a feedback filter (FBF), and
the tap coefficient update unit includes an FFF tap coefficient update unit and an FBF tap coefficient update unit,
where the FFF tap coefficient update unit is configured to update a tap coefficient of the FFF by using an output signal of the equalizer input-signal storage and an error signal from the error-signal calculator; and
the FBF tap coefficient update unit is configured to update a tap coefficient of the FBF by using an output signal of the symbol detector and an error signal from the error-signal calculator.

3. The distributed repeater of claim 1, wherein the symbol detector includes one of a viterbi decoder, a modified viterbi decoder, a soft output viterbi algorithm (SOYA) decoder, and a simple slicer.

4. The distributed repeater of claim 3, wherein the modified viterbi decoder detects a symbol from a digital broadcast signal inputted from the filtering unit by using a modified viterbi decoding algorithm with a trace back depth (TBD) of 1 and reduced complexity.

5. The distributed repeater of claim 1, wherein the selection unit selects an output signal of the symbol detector in the case of a decision-based mode, and selects an output signal of the statistical data calculator in the case of a blind mode.

6. The distributed repeater of claim 1, wherein the equalizer outputs a training sequence in a data section including the training sequence, and outputs an output signal of the symbol detector in a data section without a training sequence.

7. The distributed repeater of claim 1, wherein the identification signal generated by the identification signal generation and insertion unit is an identification signal with a good correlation characteristic.

8. The distributed repeater of claim 7, wherein the pre-processing unit comprises:
an RF receiver configured to receive an a first RF broadcast signal transmitted from a main transmitter via an Rx antenna;
an intermediate frequency (IF) down-converter configured to convert the first RF broadcast signal received by the RF receiver into an IF signal; and
a demodulator configured to convert the IF signal into a baseband signal.

9. The distributed repeater of claim 8, wherein the post-processing unit comprises:
a modulator configured to convert the baseband signal into an IF signal, the baseband signal including the identification signal inserted by the identification signal generation and insertion unit;
an RF up-converter configured to up-convert the IF signal into an a second RF broadcast signal; and
an amplifier configured to amplify the RF broadcast signal of the second RF up-converter and send the amplified RF broadcast signal via a Tx antenna.

10. A distributed repeating method for repeating signals, comprising:
receiving a first radio frequency (RF) signal transmitted from an external device and demodulating the first RF signal into a baseband signal;
equalizing the baseband signal to correct a distortion generated on a transmission channel;
generating an identification signal for identification of a distributed repeater and network conditioning, and inserting the identification signal in the equalized baseband signal; and
modulating the baseband signal including the inserted identification signal into an second RF signal different from the first RF signal, and sending the second RF signal,
wherein the equalizing the baseband signal comprises:
storing the baseband signal;
filtering the baseband signal to perform channel equalization;
detecting a symbol from the filtered baseband signal;
calculating statistical data required in a blind mode;
selecting an output signal of a decision-based mode or a blind mode;
comparing the selected output signal with the filtered baseband signal to calculate an error signal; and
updating a tap coefficient required for the filtering on the basis of the calculated error signal.

11. The distributed repeating method of claim 10, wherein the filtering the baseband signal comprises feedforward filtering and feedback filtering, and
the updating the tap coefficient comprises:
updating a tap coefficient of the feedforward filtering by using the signal stored in the storing, and the calculated error signal calculated; and updating a tap coefficient of the feedback filtering by using the signal detected in the detecting the symbol, and the calculated error signal.

12. The distributed repeating method of claim 10, wherein the selecting the output signal comprises:
   selecting a signal detected in the detecting the symbol in a case of the decision-based mode; and
   selecting the statistical data calculated in the calculating the statistical data in a case of the blind mode.

13. The distributed repeating method of claim 10, wherein the equalizing the baseband signal further comprises:
   outputting a training sequence in a data section comprising a training sequence and outputting the symbol detected in the detecting the symbol in a data section without a training sequence.

14. The distributed repeating method of claim 10, wherein the identification signal generated in the generating and inserting the identification signal is an identification signal with a good correlation characteristic.

15. The distributed repeating method of claim 14, wherein the receiving the RF signal comprises:
   receiving an a first RF broadcast signal transmitted from the main transmitter via an Rx antenna;
   down-converting the received first RF broadcast signal into an intermediate frequency (IF) signal; and
   converting the IF signal into a baseband signal.

16. The distributed repeating method of claim 15, wherein the modulating the baseband signal comprises:
   converting the baseband signal comprising the identification signal inserted in the generating and inserting the identification signal into an IF signal;
   up-converting the IF signal into a second RF broadcast signal; and
   amplifying the second RF broadcast signal and sending the amplified RF broadcast signal via a Tx antenna.

* * * * *